Feb. 18, 1941.                F. M. REID                    2,232,187
                SUPPORTING LEG STRUCTURE FOR SEMITRAILERS
                    Filed May 27, 1940          3 Sheets-Sheet 1
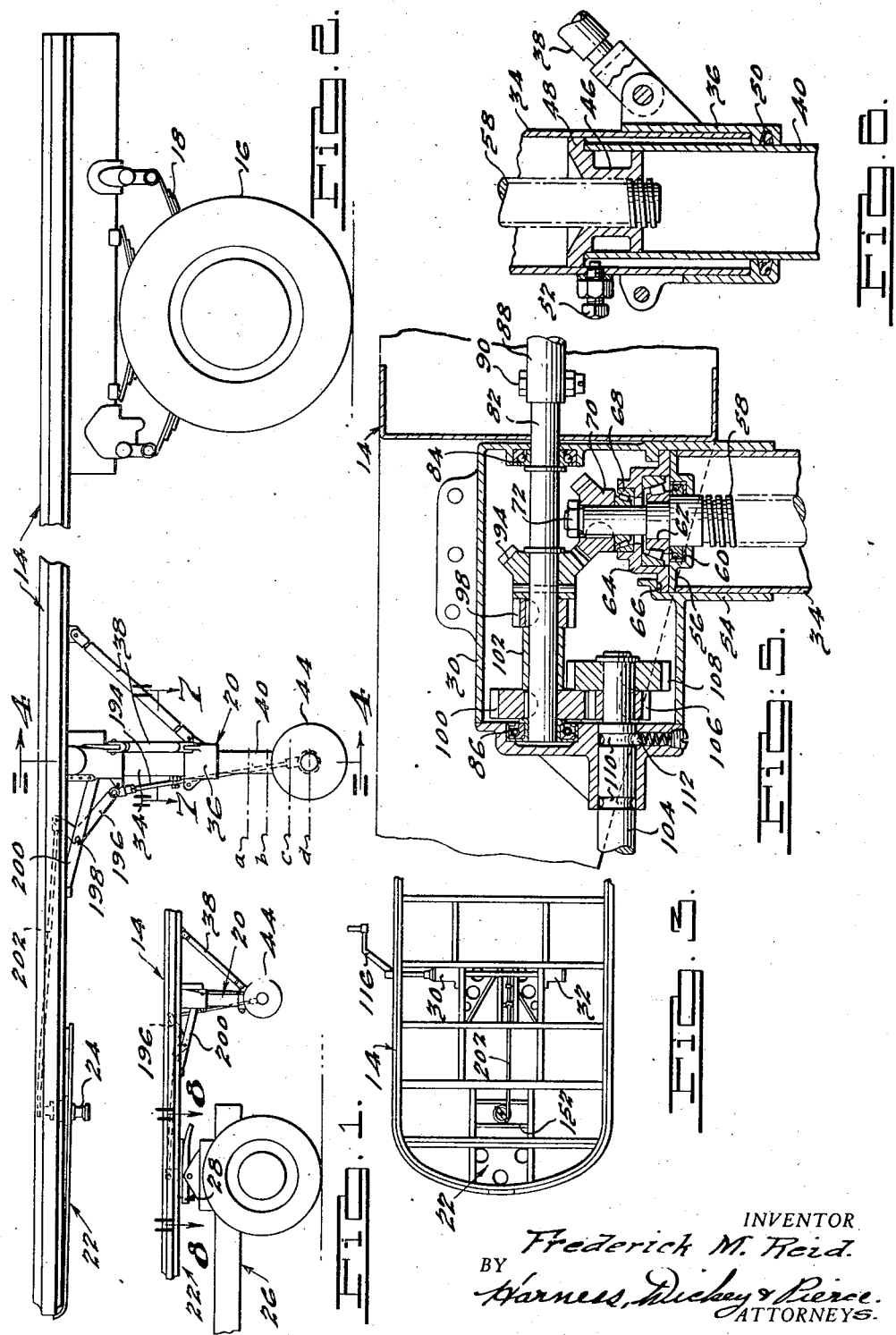
INVENTOR
*Frederick M. Reid.*
BY
*Harness, Dickey & Pierce.*
ATTORNEYS.

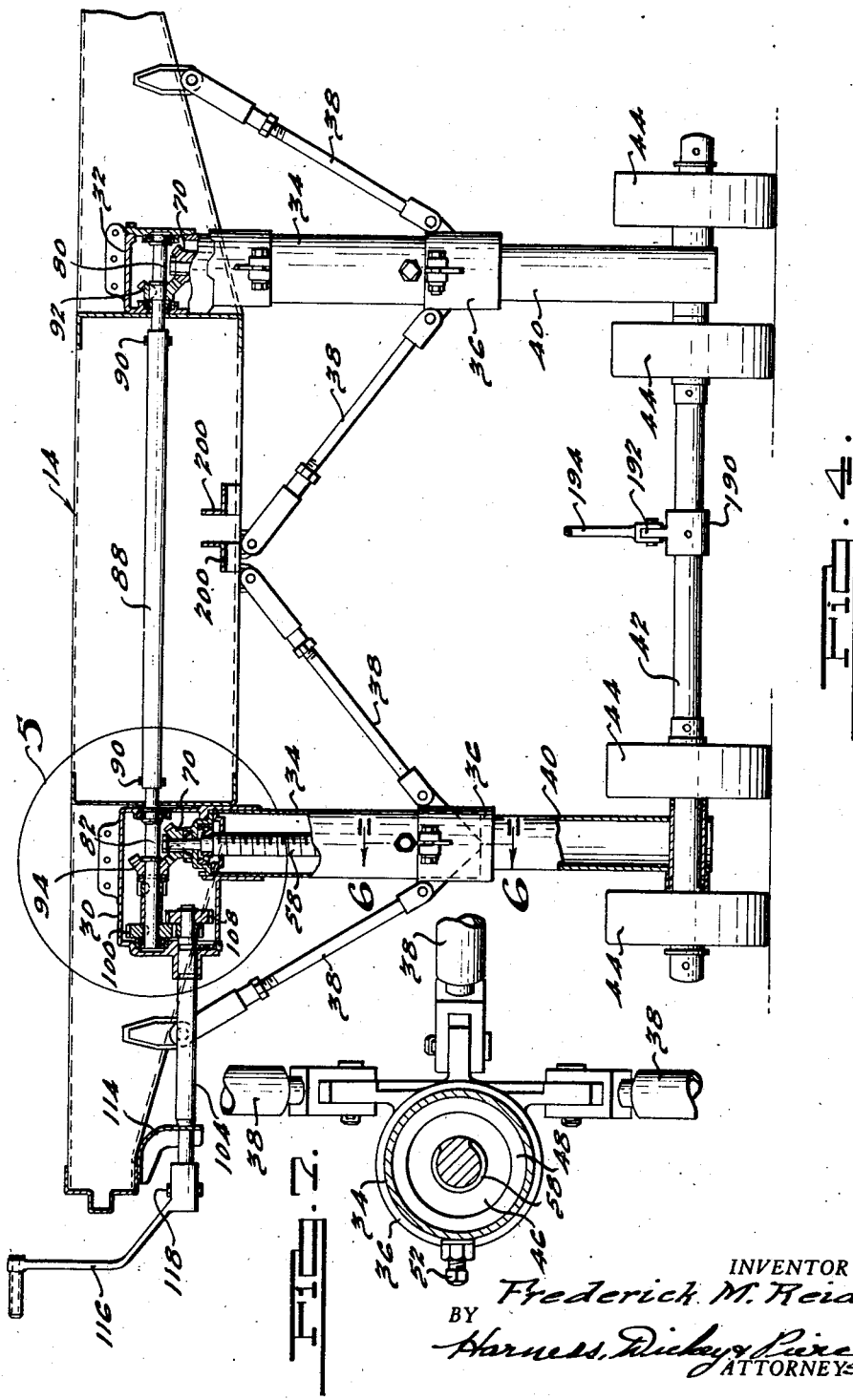

Feb. 18, 1941.  F. M. REID  2,232,187
SUPPORTING LEG STRUCTURE FOR SEMITRAILERS
Filed May 27, 1940  3 Sheets-Sheet 3
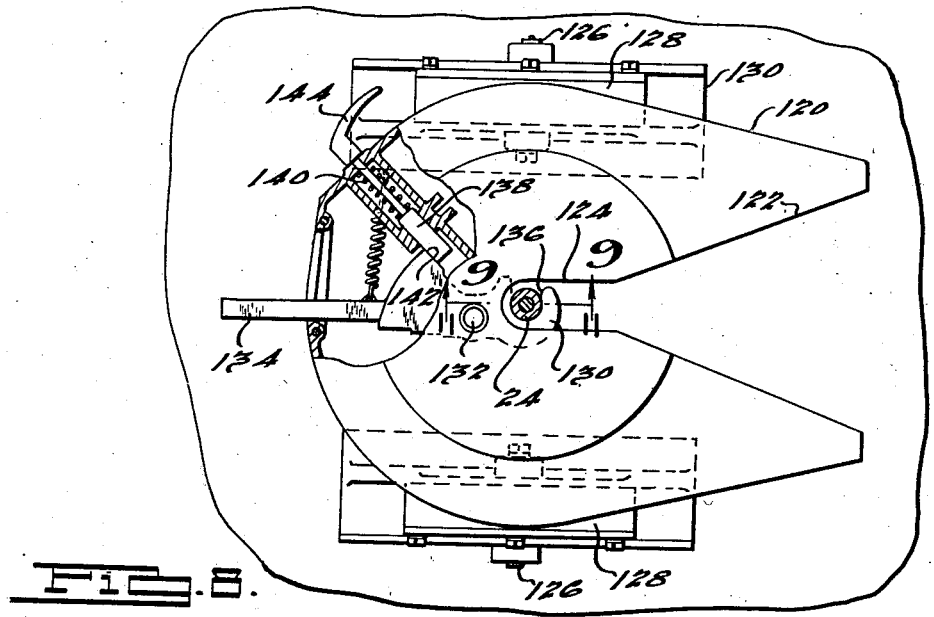
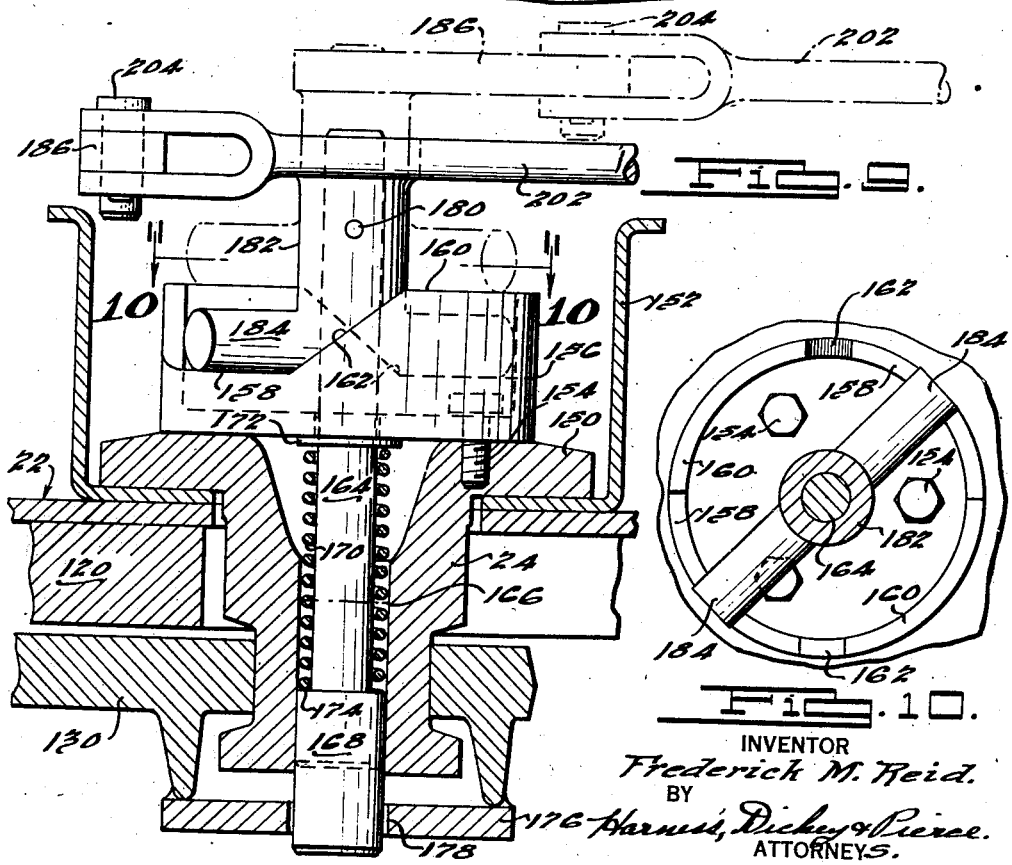
INVENTOR
Frederick M. Reid.
BY
Barnes, Dickey & Pierce.
ATTORNEYS.

Patented Feb. 18, 1941

2,232,187

UNITED STATES PATENT OFFICE 2,232,187

SUPPORTING LEG STRUCTURE FOR SEMI-TRAILERS

Frederick M. Reid, Detroit, Mich., assignor to Fruehauf Trailer Company, Detroit, Mich., a corporation of Michigan Application May 27, 1940, Serial No. 337,346

5 Claims. (Cl. 280—33.1)

This invention relates to trailer vehicles and particularly to semi-trailers, the principal object being the provision of a supporting leg structure for the forward end of semi-trailers and particularly to a safety means operated by movement thereof for controlling the connection between the fifth wheel members of the tractor and semi-trailer.

Objects of the present invention include the provision of a semi-trailer having a retractable and extensible supporting leg structure adjacent the forward end thereof and a fifth wheel structure for connection to the fifth wheel structure of a tractor, together with a connection between the supporting leg means and the fifth wheel structures so constructed and arranged as to necessitate lowering of the supporting leg structure as a condition precedent to uncoupling the tractor from the trailer; the provision of a tractor and a semi-trailer having co-operating fifth wheel structures including a latch bar or jaw on the tractor for engagement with a king-pin of the trailer and a manually operable supporting leg structure for the forward end of the trailer, latching means for the latch bar of the tractor fifth wheel being provided and connected to the leg structure for the semi-trailer in such a manner as to necessitate lowering of the leg structure for the semi-trailer before withdrawal of the latch means for the latch bar may be effected; the provision of a construction as above described in which movement of the supporting leg structure for the semi-trailer may occur after the supporting leg structure has been raised a predetermined distance, without affecting the latching of the latch bar; the provision of a construction as above described in which movement of the supporting leg structure may occur after the supporting leg structure has been lowered to a predetermined extent without affecting the operation of the latch means for the latch bar; and the provision of a construction as above described in which the inter-related movement between the supporting leg structure and the latch means for the latch bar occurs only during an intermediate stage of operation in the raising and/or lowering of the supporting leg structure.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a fragmentary side elevational view illustrating the forward end of a semi-trailer supported upon the rear end of a co-operating tractor through a suitable fifth wheel mechanism, and with the supporting leg structure of the semi-trailer in raised position;

Fig. 2 is an enlarged, partially broken, side elevational view of the semi-trailer illustrated in Fig. 1 but with the supporting wheel structure thereof in its lowered position as required to support the forward end of the semi-trailer independently of the tractor;

Fig. 3 is a plan view of the forward end of the semi-trailer illustrated in Fig. 1;

Fig. 4 (Sheet 2) is an enlarged partially broken, vertical sectional view taken transversely of the semi-trailer illustrated in Fig. 2 as on the line 4—4 thereof, illustrating the construction of the supporting leg structure therefor;

Fig. 5 (Sheet 1) is an enlarged vertical sectional view taken through the change speed mechanism at the upper end of one of the supporting leg structures shown in Fig. 4 in the same plane as in Fig. 4, and that part of Fig. 4 contained within the circle 5 of Fig. 4;

Fig. 6 is an enlarged, fragmentary, vertical sectional view taken on the line 6—6 of Fig. 4;

Fig. 7 (Sheet 2) is an enlarged fragmentary horizontal sectional view taken on the line 7—7 of Fig. 2;

Fig. 8 is a fragmentary, partially broken, partially sectioned horizontal sectional view taken on the line 8—8 of Fig. 1;

Fig. 9 is an enlarged, fragmentary, vertical sectional view taken on the line 9—9 of Fig. 8; and, Fig. 10 is a fragmentary, horizontal sectional view taken on the line 10—10 of Fig. 9.

As is commonly understood the forward ends of semi-trailers are conventionally provided with retractable and extensible supporting leg structures which, when the forward end of the trailer is supported upon the rear end of a tractor vehicle and is being drawn thereby, is intended to be positioned in elevated condition out of possible contact with the road surface, and when the tractor is about to be withdrawn from supporting relation with respect to the forward end of the trailer, or has been withdrawn from supporting relation therefrom, is adapted to be positioned in lowered position and in contact with the road or other supporting surface so as to enable it to support the forward end of the semi-trailer independently of the tractor. The so-called "automatic" type semi-trailers are so constructed and arranged that the act of coupling the tractor to the semi-trailer operates to automatically position the supporting leg structure of the semi-trailer in elevated position and the act of uncoupling the tractor from the semi-trailer automatically acts to position the supporting leg structure in lowered position, both operations being accomplished by a movement of the tractor with respect to the semi-trailer and, therefore, relieving the operator from any manual effort. Such automatic constructions are, however, relatively expensive and for that reason the majority of semi-trailers are provided with supporting leg structures which must be manually operated between elevated and lowered position. Such manually operated supporting leg structures may assume a variety of different types of construction but in the majority of them the leg structure is either mounted on the semi-trailer for pivotal movement with respect thereto between raised and lowered positions, or the supporting leg structure includes telescoping parts one part of which is fixed to the semi-trailer and the other part of which is slidable vertically with respect thereto. In either case manually operated screw means are usually provided for effecting the raising and lowering of the leg structure.

Inasmuch as such manually operated means must be such that a single operator or his helper is capable of raising or lowering the forward end of the semi-trailer when the semi-trailer is fully loaded and when required to position the forward end of the semi-trailer in proper position to enable a tractor to be coupled thereto, a relatively high gear ratio must be provided between the operating crank and the screw to permit this to be accomplished. Accordingly, when the trailer is not loaded, and particularly after the tractor has been coupled to the forward end of the trailer so as to relieve the supporting leg structure from any load, and when lowering the supporting structure from inoperative position to supporting position before a tractor is withdrawn from supporting relation thereto, it requires the operator to turn the operating crank through an unsually large number of turns in order to elevate or lower the supporting leg structure to the desired extent. The accompanying drawings illustrate a structure whereby this defect in existing constructions is eliminated, this part of the structure forming the subject-matter of my co-pending application for Letters Patent of the United States for Improvements in supporting leg structure for semi-trailers, filed October 24, 1940 and serially numbered 362,529, the same being a division of the present application.

In the automatic type of semi-trailers above described it is essential to provide an automatically operable latching mechanism for the king-pin latch of the tractor which will prevent the latch from being released from the king-pin on the semi-trailer before the supporting leg structure of the semi-trailer is in operative supporting relation with respect to the road or other supporting surface. Such automatically operable acting mechanism is also constructed to require full elevation of the supporting leg structure before the tractor becomes fully connected to the semi-trailer. However, in the manually operated types of supporting leg structures the same general effect has not been conventionally provided so that in most cases it is possible to withdraw the tractor from supporting relation with respect to the front end of the semi-trailer before the supporting leg structure has been lowered, such occurrences, of course, causing considerable inconvenience and usually some material damage to the semi-trailer or its contents. Also in such constructions if the operator forgets to raise the supporting leg structure prior to drawing away of the semi-trailer by the tractor, contact of the supporting leg structure with the road bed often results in damage to the supporting leg structure. It is a further object of the present invention to provide a new and novel form of safety latch mechanism for the latch bar of a tractor so constructed and arranged that the latch bar of the tractor cannot be withdrawn from operative engagement with the king-pin of the semi-trailer until the supporting leg structure for the semi-trailer has been moved into a lowered position.

Referring now to the accompanying drawings, in Figs. 1 and 2 a semi-trailer is illustrated as having a frame structure indicated generally at 14. The rear end of the frame structure 14 is supported by conventional wheels 16 connected to the frame 14 by means of conventional springs 18. A supporting leg structure indicated generally at 20 is provided for the forward end of the frame 14. In the broader aspects of the present invention the supporting leg structure 20 may be either of the type which is pivotally secured to the frame at its upper end and is swingable about its line of pivot to raise and lower the supporting leg structure between inoperative and operative positions, or it may be of the type including relatively slidable parts or sections one of which is fixed with respect to the frame and the other of which is slidable vertically with respect thereto. The latter type is selected herein for the purpose of illustration.

The forward end of the frame 14 is provided on its lower surface with a fifth wheel structure indicated generally at 22 to which is fixed a downwardly extending king-pin 24. The rear end of the tractor which is indicated generally at 26 in Fig. 1 is provided at its rear end with a fifth wheel structure indicated generally at 28, the details of which will be more fully described later.

As best illustrated in Figs. 4 and 5 the supporting leg structure includes a pair of gear boxes 30 and 32 fixed to the frame 14 of the semi-trailer at opposite sides of the same in alignment transversely and vertically of the frame 14. Fixed to each of the gear boxes 30 and 32 is a downwardly extending cylindrical tube 34. The lower end of each tube 34 is provided with a collar 26 suitably clamped thereto to each of which is pivotally secured three adjustable struts 38 extending in different directions and suitably fixed at their upper ends to the frame 14 for bracing the lower end of the tubes 34 against relative movement with respect to the frame 14. Telescopically received in each of the tubes 34 is a tubular member 40 and extending between and through the lower ends of the tubes 40 is an axle shaft 42 which, in the particular construction shown, rotatably carries a supporting wheel 44 on each side of each member 40.

Referring now to Fig. 6 it will be noted that in the upper end of each of the tubes 40 is received a circular nut member 46 provided with a cylindrical flange 48 at its upper end of a diameter to be relatively closely received within the bore of the corresponding member 34. The flange 48 extends radially outwardly beyond the outer surface of the member 40 and rests upon the upper end of the member 40 to which it is suitably secured as by welding or the like. The lower end of the sleeve 36 projects radially inwardly below and beyond the lower end of the tube 34 where it closely receives the exterior surface of the tube 40 therein and serves to guide it in its vertical slidable movement. Such inwardly turned lower end of the collar 36 is preferably internally grooved to receive a ring 50 of packing material serving as a dust seal to prevent foreign material from being drawn upwardly into the interior of the tube 34. A stop screw 52 projected through the wall of the tube 34 below the flange 48 is adapted to engage the flange 48 to limit downward movement of the tube 40 in the tube 34.

It will be understood that the upper ends of the tubes 34 are similarly positioned and arranged in their respective housings 30 and 32 and, accordingly, a description of the connection between the upper end of the lefthand tube 34 (as viewed in Fig. 4) with its housing 30 will also suffice as a description of the connection between the upper end of the righthand tube 34 with its housing 32. Referring now to Fig. 5, it will be observed that within the sleeve 54 of the housing 30 which receives the upper end of the corresponding tube 34 a centrally apertured disc-like member 56 overlies the upper end of the tube 34 and is provided with a central opening through which the upper end of a screw shaft 58 projects. The member 56 is centrally depressed to form a pocket for reception of a grease seal 60 surrounding the upper end of the screw shaft 58. Immediately above the grease seal 60 the shaft 58 is reduced in diameter to provide a shoulder against which the inner race of a tapered roller bearing assembly 62 seats. The outer race of the bearing 62 is received in a cap member 64 overlying the member 56 with its outer marginal edge portion received below an inwardly directed shoulder 66 formed at the upper end of the sleeve 54 and within the housing 30. A second roller bearing assembly 68 is received within a recess formed in the upper end of the cap 64 about the upper end of the screw shaft 58 and immediately above it the screw shaft 58 receives thereon a beveled gear 70 suitably fixed against rotation with respect thereto and held against axial displacement by means of the nut 72. Thus the upper end of the screw shaft 58 is locked against axial displacement between the bearings 62 and 68 with respect to the housing 30 but is free to rotate therein. The lower end of the screw shaft 58, as indicated in Fig. 6, is received by the nut member 46 so that when the screw shafts 58 are both rotated in the same direction and simultaneous with each other the tubes 40 and consequently the supporting wheels 44 are caused to be simultaneously raised or lowered depending upon the direction of rotation of the screw shaft 58.

In order to effect simultaneous rotation of the screw shaft 58 the following mechanism is provided. The housing 32 is provided with a transverse shaft 80 therein provided with suitable bearings in the opposite side walls of the casing and the inner end of the shaft 80 projects outwardly through the corresponding wall of the casing 32 and through the associated member of the frame 14 as indicated in Fig. 4. A similar shaft 82 extends between the side walls of the housing 30 and, as illustrated best in Fig. 5, such walls are provided with suitable bearings 84 and 86 therein for rotatably supporting the shaft 82. The inner end of the shaft 82 projects through the corresponding side wall of the housing 30 and through the associated member of the frame 14 and such projecting end is drivingly connected to the inwardly projecting end of the shaft 80 of the housing 32 by means of a tubular shaft 88 fixed against relative rotation with respect to the shafts 80 and 82 by means of bolts 90. The shafts 80 and 82 have fixed thereto beveled gears 92 and 94, respectively, which lie in mesh with the corresponding bevel gears 70 on the corresponding screw shafts 58. Thus the screw shafts 58 are connected together for simultaneous rotation in the same direction.

Now referring to Fig. 5 it will be noted that the gear 94 has formed integrally with the hub portion thereof a pinion gear 98 and has also fixed thereto a second pinion gear 100 of materially larger diameter than the pinion gear 98. Collars 102 may be provided on the shaft 82 for properly spacing the gears 98 and 100 from each other as hereafter more fully described. Rotatably and axially slidably supported in the housing 30 below the shaft 82 is a second shaft 104 in parallel relation thereto and its inner end projects into the housing 30 and within the housing 30 has non-rotatably fixed thereto a pair of adjacent or contacting pinion gears 106 and 108. The pinion gear 106 is of such diameter that when transversely aligned with the gear 100 its teeth properly mesh with the teeth of the gear 100 and the pinion gear 108 is of such diameter that when transversely aligned with the pinion gear 98 its teeth are properly meshed with the teeth of the pinion gear 98. The gears 98 and 100 are spaced axially from one another by a distance greater than the combined thickness of both the gears 106 and 108, and the shaft 104 together with the gears 106 and 108 is axially shiftable in the housing 30 so as to enable the gear 106 to be placed in meshing relationship with the gear 100 and to enable the gear 108 to be placed in meshing relationship with the gear 98, the spacing of the gears 98 and 100 being such as to prevent both gears 106 and 108 from being simultaneously engaged by their cooperating gears 100 and 98.

In order to releasably position the shaft 104 and the gears 106 and 108 in either of their operative positions with respect to the gears 100 and 98, respectively, the shaft 104 is provided with a pair of grooves 110 in its periphery and a spring pressed ball 112 is carried by the casing 30 in a position to be projected into either of the grooves 110 when brought into transverse alignment therewith. One groove 110 is positioned to receive the ball 112 when the gears 106 and 100 are in meshing relationship and the other groove 110 is positioned to receive the ball 112 when the gears 98 and 108 are in meshing relationship.

As illustrated in Fig. 3 and best in Fig. 4, the shaft 104 is extended outwardly to a point adjacent the outer edge of the frame 14 where it is preferably supported by means of a bracket such as 114 carried by the frame, and is there provided with a hand crank 116 which is fixed thereto as by means of a bolt 118. It will be appreciated that when the gears 106 and 100 are in mesh with each other, or the gears 108 and 98 are in mesh with each other and the hand crank 116 is turned to rotate the shaft 104, both shafts 80 and 82 will be rotated and act through their corresponding bevel gears to rotate the corresponding screw shafts 58. Because of the fact that the gear 100 is much larger than the gear 98, when the gears 106 and 100 are in mesh with each other it will require a greater number of turns of the hand crank 116 to rotate the screw shaft 58 a predetermined number of times than would be the case when the gears 108 and 98 are in mesh with each other. Accordingly, where the semi-trailer is heavily loaded the hand crank 116 may be grasped and pulled outwardly with respect to the center line of the trailer to bring the gears 106 and 100 into mesh with each other whereby a relatively large reduction in the drive between the hand crank 116 and the screw shaft 58 is provided to enable an operator to raise or lower the leg structure in order to vertically adjust the forward end of the semi-trailer, with a minimum amount of exertion.

Similarly when the forward end of the semi-trailer is not heavily loaded, or under conditions where the forward end of the semi-trailer is supported upon a tractor and it is desired to lower the supporting leg structure from an inoperative position to a position in contact with the ground, the hand crank 116 may be pushed inwardly to bring the gears 108 and 98 into engagement with each other and then rotated to effect lowering of the leg structure into contact with the ground with a minimum number of turns of the hand crank 116. In such case as soon as the leg structure comes into contact with the ground the hand crank 116 may be pulled outwardly to engage the gears 100 and 106 and then rotation of the same continued to raise the forward end of the semi-trailer the desired distance. Also it will be understood that when a trailer is supported by the leg structure 20 and the tractor is backed under the front end of the same into supporting relation with respect thereto, the handle 116 may be moved to connect the gears 98 and 108 whereby the leg structure may be raised to inoperative position with a minimum number of turns of the hand crank.

In conventional construction where a crank corresponding to the crank 116 is directly connected to shafts corresponding to the shafts 80 and 82, the ratio of reduction between such shafts and the screws being unchangeable is necessarily a compromise between that permitting a maximum speed of operation of the supporting structure with that required to physically enable an operator to raise or lower the forward end of the semi-trailer when heavily loaded. Accordingly, the ratio selected is not favorable to either one or the other. In accordance with the construction shown, however, the ratio between the gears 100 and 106 may be sufficient to enable an operator to easily raise or lower the forward end of a heavily loaded trailer, and the ratio between the gears 98 and 108 such as to enable a maximum rate of movement to be imparted to the supporting leg structure when the load thereon is relieved or is relatively light. The construction, therefore, provides a means whereby the desired movement of the supporting leg structure may be accomplished in a minimum length of time and/or with a minimum amount of effort on the part of the operator.

In accordance with the present invention and regardless of whether the particular supporting leg structure described is employed or not, means are provided whereby lowering of the supporting leg structure of the semi-trailer constitutes a condition precedent to uncoupling of the tractor from the trailer. The present invention may be employed with any suitable type of construction of fifth wheel structure for the tractor, that shown being illustrative of merely the principles of this phase of the invention.

The particular type of tractor fifth wheel structure illustrated in Fig. 8 is that shown and described in my United States Letters Patent No. 1,925,279, issued September 5, 1933, on Tractor semi-trailer fifth wheel structure. Briefly, it comprises a plate-like member 120, the rear end of which is provided with a relatively wide V-shaped slot 122 therein which converges into a relatively narrow slot 124 positioned centrally thereof. At its opposite side it carries horizontally directed aligned pivot pins 126 pivotally each connecting it to a bracket 128, which brackets extend into corresponding housings 130 carried by the frame of the vehicle and within which the lower parts of the brackets 128 are imbedded in a mass of rubber, not shown.

When the semi-trailer is connected to the tractor the fifth wheel structure 22 of the semi-trailer is adapted to ride up on and rest upon the upper surface of the plate 120, and the king-pin 24 is adapted to be guided by the sides of the slots 122 into the slot 124 where it may be latched against separation by a latch member 130 positioned below the plate 120, and pivoted thereto as at 132, the latch 130 being provided with an operating handle 134. The latch 130 is provided with a U-shaped recess 136 opening onto one side thereof within which the king-pin 24 is adapted to be engaged and held when the tractor is pulling the trailer.

In order to prevent inadvertent dis-engagement of the latch 130 with the king-pin 24 a spring pressed latch bolt 138 is carried by the plate 120 and is projectable radially of the center of the plate 120 by means of a spring 140 into intersecting relation with respect to a stop surface 142 on the operating handle 134 which locks the latch 130 against clockwise direction of rotation about the pivot pin 132 when operatively engaged therewith. The latch bolt 138 is provided with an operating handle 144 by means of which it may be manually withdrawn from engagement with the surface 142 when it is desired to swing the latch 130 out of engaged relationship with respect to the king-pin 24.

In order to prevent the latch 130 from being withdrawn from engaged relation with respect to the king-pin 24 until the supporting leg structure 20 has been lowered a predetermined extent, and independently of movement of the latch bolt 138, the following described mechanism is provided.

Referring now to Figs. 9 and 10 it will be noted that the upper end of the king-pin 24 is provided with a head 150 which overlies the bottom wall of the channel sectioned member 152 through which the king-pin 24 projects downwardly through the fifth wheel structure 22 for the semi-trailer. Fixed to the upper surface of the head 150 as by means of screws 154 is an upwardly opening cup-shaped member 156 the upper axial edges of which are formed to provide cam surfaces. There are two identical sets of such cam surfaces each occupying an angular extent of 180° and each of such cam surfaces includes a horizontal lower portion 158, a horizontal upper portion 160 axially spaced therefrom, and an interconnecting angular portion 162. It will be observed that the member 156 is concentric with the king-pin 24 and is provided with a central aperture through which a vertically extending pin 164 is received and guided. The king-pin 24 is provided with an axial bore 166 into which the pin 164 projects and the lower end of the pin 164 is enlarged to form a latch bolt portion 168 which is closely but slidably and rotatably received in the lower part of the bore 156 and is capable of being projected downwardly below the lower end of the king-pin 24. A coil spring 170 surrounds the pin 164 between the washer 172, encircling the pin 164 immediately below the member 156, and the shoulder 174 formed at the junction of the pin 164 with its enlarged head or latch bolt portion 168, the spring being maintained under compression between the washer 172 and the shoulder 174 and constantly urging the pin 164 downwardly.

The latch 130, as best brought out in Fig. 9, below the lower end of the king-pin 24 is provided with a plate member 176 fixed thereto as by welding or the like which extends under the recess 136 of the latch 130 and is provided with a central aperture 178 therein which, when the latch 130 is in operative position with respect to the king-pin 24, is aligned with the pin 164. When the pin 164 is in its lowermost position of operation the head 168 thereof projects downwardly through the opening 178 in the plate 176 and, therefore, locks the latch 130 against pivotal movement about the pivot pin 132 regardless of the position of the latch bolt 138. It is, therefore, necessary to raise the pin 164 a sufficient distance to retract the head 168 thereof from the opening 178 in the plate 176, in addition to withdrawing the latch bolt 138, before it is possible to move the operating handle 134 to bring the latch 130 out of engaging relation with respect to the king-pin 24.

In order to raise and lower the pin 164 the following mechanism is provided. Fixed to the pin 164 above the cam member 156 by means of a pin such as 180 is a hub member 182. This hub member 182 has formed integrally therewith a pair of diametrically oppositely extending cylindrical pins 184 adapted to lie against and engage the corresponding cam surfaces 158, 160 and 162, and engagement of which with these cam surfaces controls the axial position of the pin 164. At its upper end the hub 182 has formed integrally therewith an arm 186 by means of which the hub 182, pins 184 and pin 164 may be rotated.

It will be appreciated from an inspection of Figs. 9 and 10 that when the pins 194 lie against the corresponding cam surfaces 158 the spring 170 will tend to maintain this contact and, therefore, maintain the head 168 of the pin 164 in the opening 178 of the plate 176. If now the arm 168 is turned to rotate the hub 182 and pins 184 in a counterclockwise direction of rotation as viewed in Fig. 10, the pins 184 in thus rotating will slide over the surface of the cam surfaces 158 and then contact the cams 152 which, upon continued rotation of the hub 182, will act through the pins 184 to lift the hub 182 and pin 164 until the pins 184 reach the cam surfaces 160, upon which further rotation of the hub 182 and pins 184 will not cause any further lifting of the pin 164. As the pins 184 ride up on their corresponding cam surfaces 162 and cause the pin 164 to move axially upwardly against the force of the springs 170, it will lift the head 168 axially upwardly out of interferring relation with respect to the plate 176 and thus withdraws it out of latching relation with respect to the latch 130 so that thereafter, upon withdrawal of the latch bolt 138, the latch 130 may be rotated by the operating arm 134 to free the king-pin 24 from the tractor fifth wheel. One feature to be observed in connection with the above construction is that during rotary movement of the hub 182 through an angularity of approximately 100°, which is preferably the angle to which the hub 182 is rotated in operation, there are three distinct phases of movement, the first and last of which have no effect whatever on the vertical position of the pin 164, which vertical movement occurs only during the intermediate phase of movement.

In order to correlate the movement of the latch pin 164 through the cam member 156 and pins 184 with the position of the supporting leg structure 20 of the semi-trailer, and where the semi-trailer is provided with a supporting leg structure of the general type described, the following mechanism is provided. Referring now to Fig. 4 it will be noted that the axle midway its length is provided with a sleeve 190 having a lug 192 projecting therefrom to which the lower bifurcated end of a link 194 is pivotally secured. As best illustrated in Fig. 1 a bellcrank lever 196 is pivotally mounted at 198 between a pair of angle bars 200 suitably fixed to the frame 14, this bellcrank 196 having a long arm and a short arm. The upper end of the link 194 is pivotally connected to the free end of the long arm of the bellcrank 196. Another link 202 is pivotally connected at one end to the free end of the short arm of the bellcrank 196 and at its opposite end by means of a pin 204 to the free end of the arm 186 on the hub 182. The length of the links 194 and 202 are such that when the supporting leg structure is in lowered position as illustrated in Fig. 2, the bellcrank 196 has been rotated in a clockwise direction of rotation as viewed in Fig. 2 a sufficient distance to bring the pins 184 up on their corresponding cam surfaces 150, in other words, to the position indicated in dotted lines in Fig. 9 and in which position the head 168 of the pin 164 is at its upper limit of travel and out of interferring relation with respect to the plate 176 on the latch 130. Consequently, the latch 138 may be withdrawn and the latch 130 swung out of engaging relation with respect to the king-pin 24, thus permitting the tractor 26 to be withdrawn from supporting relation with respect to the forward end of the semi-trailer.

With the supporting leg structure in a position indicated in full lines in Fig. 2, if the trailer 26 is now backed under the forward end of the semi-trailer and the latch 130 operatively engaged with the king-pin 24, and the crank 116 operated to raise the wheels 44, as the wheels 44 are raised the link 194 connecting the axle 142 to the bellcrank 196 will cause the bellcrank 196 to turn in a counterclockwise direction of rotation as viewed in Fig. 2 and will move the link 202 forwardly, causing the hub 182 to rotate in a clockwise direction of rotation as viewed in Fig. 10 and allow the pins 184 to ride down their respective cam surfaces 162 to their corresponding cam surfaces 158 and thus permit the spring 170 to project the pin 164 and its head 168 into engaging relationship with respect to the opening 178 in the plate 176 and thus prevent withdrawal of the latch member 130 from the king-pin 24 while the wheels 44 are in their raised position. Thus with the above described construction it will be impossible to unhook the tractor from the semi-trailer until the supporting wheels 44 have been lowered a predetermined distance from their normally raised or inoperative position.

Because of the fact that raising and lowering of the latch pin 164 occurs only during an intermediate phase of angular movement of the hub 182 as above described, that movement of the supporting leg structure 20 required to effect full withdrawal or full projection of the pin 164 with respect to the plate 176 of the latch 130 will occur during an intermediate phase of movement of the supporting leg structure between its fully retracted and fully projected position. In other words, and now referring to Fig. 2, let it be assumed that the wheels 44 are capable of a vertical movement between the lines a and d in moving between fully raised and fully lowered position. That movement of the wheels 44 required to effect full raising or full lowering of the pin 164 may be assumed to take place during movement of the wheels 44 between the lines b and c. Consequently during movement of the wheels between the lines a and b and between the lines c and d no vertical movement of the pin 164 occurs. This feature of having the pin 164 fully projected or retracted during an intermediate phase of movement of the supporting wheels 44 is important because of the fact that it is often desirable to adjust the elevation of the front end of the semi-tractor by means of the supporting leg structures to accommodate different tractors having varying heights of fifth wheel structure above the ground, and in such case should such adjustment of the supporting leg structure involve a corresponding axial movement of the pin 164, interference between the latch 130 and the head 168 of the pin 164 might result. It is also desirable to permit adjustment of the position of the wheels 144 at the upper end of their movement in a retracting direction as it is not always essential that the supporting wheels be fully retracted when a semi-trailer is being drawn by a tractor, particularly during a relatively short haul. Accordingly, with the mechanism provided as above described it will be appreciated that an ideal arrangement is provided between the latching mechanism for the king-pin latch and the supporting leg structure of the semi-trailer positively necessitating lowering of the supporting legs prior to withdrawal of the tractor and yet permitting the necessary adjusting movement of the supporting legs without affecting the operativeness of this safety device.

Formal changes may be made in the specific embodiment of the invention described without departing from the spirit or substance of the broad invention, the scope of which is commensurate with the appended claims.

What is claimed is:

1. In a tractor semi-trailer combination of the class wherein the tractor is provided with a fifth wheel structure including a movable latching element adapted to releasably engage the king-pin of the semi-trailer, in which the semi-trailer is provided with a fifth wheel structure including a king-pin engageable by the latching member of the tractor fifth wheel and the semi-trailer is also provided with a raisable and lowerable supporting leg structure, the combination with said supporting leg structure and said fifth wheel structure of a latch pin rotatably and axially slidably received within said king-pin, means on said latch element formed for interlocking engagement with said latch pin when said latch pin is in one limit of its axially movable positions, means inter-connecting said latch pin and said supporting leg structure operable to rotate said latch pin during and by reason of lowering and raising movements of said supporting leg structure, and cam means co-operable with said latch pin for effecting axial movement of said latch pin during rotational movement thereof.

2. In a tractor semi-trailer combination of the class wherein the tractor is provided with a fifth wheel having a movable king-pin latching element and the semi-trailer is provided with a fifth wheel having a king-pin engageable by the latching element of the tractor fifth wheel and is provided with extensible and retractable supporting legs, the combination with said legs and said fifth wheel structure of a latch pin axially reciprocably mounted in said king-pin, said latching element being formed to inter-engageably receive said latch pin when said latch pin is in one limit of its axially movable positions whereby to lock said latching element against releasing movement with respect to said king-pin, means interconnecting said leg structure with said latch pin for effecting rotational movement of said pin during raising and lowering of said leg structure, cam means carried by said semi-trailer, and cam follower means on said latch pin operatively engaging said cam means whereby to effect axial movement of said latch pin as a result of said rotational movement imparted thereto.

3. In a tractor semi-trailer combination of the class wherein the tractor is provided with a fifth wheel structure including a movable latching element adapted to releasably engage the king-pin of the semi-trailer, in which the semi-trailer is provided with a fifth wheel structure including a king-pin engageable by the latching member of the tractor fifth wheel and the semi-trailer is also provided with a raisable and lowerable supporting leg structure, the combination with said supporting leg structure and said fifth wheel structure of a latch pin rotatably and axially slidably received within said king-pin, means on said latch element formed for interlocking engagement with said latch pin when said latch pin is in one limit of its axially movable positions, means interconnecting said latch pin and said supporting leg structure operable to rotate said latch pin during and by reason of lowering and raising movements of said supporting leg structure, and cam means cooperable with said latch pin for effecting axial movement of said latch pin in one direction during rotation thereof in one direction, and spring means constantly urging said latch pin in the opposite of said directions of axial movement.

4. In a tractor semi-trailer combination of the class wherein the tractor is provided with a fifth wheel structure including a movable latching element adapted to releasably engage the king-pin of the semi-trailer, in which the semi-trailer is provided with a fifth wheel structure including a king-pin engageable by the latching member of the tractor fifth wheel and the semi-trailer is also provided with a raisable and lowerable supporting leg structure, the combination with said supporting leg structure and said fifth wheel structure of a latch pin rotatably and axially slidably received within said king-pin, means on said latch element formed for interlocking engagement with said latch pin when said latch pin is in one limit of its axially movable positions, means interconnecting said latch pin and said supporting leg structure operable to rotate said latch pin during and by reason of lowering and raising movements of said supporting leg structure, and cam means co-operable with said latch pin for effecting axial movement of said latch pin during rotational movement thereof, said cam means being so constructed and arranged as to effect substantially full axial movement of said latch pin during a portion only of the rotational movement imparted to said latch pin during movement of said supporting leg structure between fully retracted and fully lowered position.

5. In a tractor semi-trailer combination of the class wherein the tractor is provided with a fifth wheel having a movable king-pin latching element and the semi-trailer is provided with a fifth wheel having a king-pin engageable by the latching element of the tractor fifth wheel and is provided with extensible and retractable supporting legs, the combination with said legs and said fifth wheel structure of a latch pin axially reciprocably mounted in said king-pin, said latching element being formed to inter-engageably receive said latch pin when said latch pin is in one limit of its axially movable positions whereby to lock said latching element against releasing movement with respect to said king-pin, means interconnecting said leg structure with said latch pin for effecting rotational movement of said pin during raising and lowering of said leg structure, cam means carried by said semi-trailer, and cam follower means on said latch pin operatively engaging said cam means whereby to effect axial movement of said latch pin as a result of said rotational movement imparted thereto, said cam having a cam surface providing end portions arranged in planes substantially perpendicular to the axis of said latch pin and spaced from each other axially of said latch pin, together with an intermediate portion interconnecting said end portions and arranged at an angle therebetween, whereby only movement of said cam follower means on said intermediate portion is effective to impart axial movement to said latch pin.

FREDERICK M. REID.